United States Patent [19]

Wu

[11] Patent Number: 4,556,110

[45] Date of Patent: Dec. 3, 1985

[54] CORROSION INHIBITION

[75] Inventor: Yulin Wu, Bartlesville, Okla.

[73] Assignee: Phillips Petroleum Company, Bartlesville, Okla.

[21] Appl. No.: 645,722

[22] Filed: Aug. 30, 1984

[51] Int. Cl.$^4$ ............................................. C23F 11/16
[52] U.S. Cl. ................................. 166/310; 252/8.55 E; 252/389 R; 252/391; 252/394; 422/12; 422/16; 422/9
[58] Field of Search ................. 252/8.55 E, 8.55 D, 252/391, 394, 389 R; 166/244 C, 310; 422/12, 16, 9

[56] References Cited

U.S. PATENT DOCUMENTS

| | | | |
|---|---|---|---|
| 2,583,399 | 1/1952 | Wachter et al. | 252/8.55 E |
| 2,828,259 | 3/1958 | Wirtel et al. | 252/8.55 E |
| 2,839,465 | 6/1958 | Jones | 252/8.55 E |
| 2,863,837 | 12/1958 | Kowald et al. | 252/394 |
| 3,876,371 | 4/1975 | Costain et al. | 252/394 X |
| 4,455,254 | 6/1984 | Stapp | 252/8.55 D |
| 4,455,255 | 6/1984 | Stapp | 252/8.55 D |

*Primary Examiner*—Herbert B. Guynn
*Attorney, Agent, or Firm*—Howard D. Doescher

[57] ABSTRACT

A corrosion-inhibiting composition of matter comprising (1) the reaction mass resulting from the reaction of an $\alpha,\beta$-unsaturated hydrocarbyl nitrile and a metal hydrocarbyl sulfonate, (2) an alcohol, (3) a hydrocarbon diluent, and optionally (4) an epoxy resin. The composition is particularly useful in the treatment of downhole metal surfaces in oil and gas wells for inhibiting the corrosion of the metal.

17 Claims, No Drawings

CORROSION INHIBITION

BACKGROUND OF THE INVENTION

This invention relates to the treatment of metal surfaces to increase resistance to corrosion. In addition, the invention further relates to compositions which form a corrosion-resistant film on metal surfaces to which they are applied.

The problem of corrosion of metal surfaces in contact with air and water is well known. Corrosion and pitting are accelerated in environments in which metal surfaces are in contact with chemicals, such as hydrogen sulfide, carbon dioxide and organic acids and water having a high electrolyte concentration. Such environments are typical of down-well conditions in oil and gas wells in which corrosion of metal pipes, pumps and other equipment poses a serious problem requiring monitoring of well sites, frequent maintenance, and costly replacement of parts. Oil recovery operation in deep-sea oil fields present these corrosion problems in their most extreme form. The down-well metal surfaces are in contact with large quantities of corrosive chemicals, such as dissolved acid gases present in the recovered oil and, in addition, the metal surfaces are subjected to temperatures of 250° F. or higher and pressures of 3,000 psig or higher. The extreme conditions of temperature and pressure acting to accelerate corrosion and to intensify the problems of applying and maintaining chemical protection for the equipment. In off-shore oil wells, secondary recovery operations involving waterflooding of the undersea formations subjects the down-well equipment to highly corrosive sea water containing dissolved oxygen.

Conventional corrosion-inhibiting agents are often not effective at all under such extreme conditions or reduce corrosion for only a short period of time and then must be reapplied, often at great expense and inconvenience if the well site is not easily accessible or, as in the case of an off-shore well, poses difficulties of transporting and applying large volumes of chemicals.

Accordingly, an object of this invention is to provide a composition which can be applied to a metal surface to inhibit corrosion and pitting on the metal.

It is a further object of the invention to provide a method of treating metal surfaces so as to form a film which inhibits corrosion on the metal even under extreme conditions of temperature and pressure and in highly corrosive environments.

Other objects, aspects, as well as the several advantages of the invention will be apparent to those skilled in the art upon reading the specification and the appended claims.

SUMMARY OF THE INVENTION

According to the invention, there is provided a composition which when applied to a metal surface forms a corrosion-inhibiting film on the metal surface, the composition comprising the reaction mass resulting from the reaction of:
(1) unsaturated hydrocarbyl nitrile, and
(2) metal hydrocarbyl sulfonate, to which is added
(3) alkanol.

In one embodiment the composition further comprises hydrocarbon diluent.

In another embodiment the composition further comprises a hydrocarbon diluent and optionally an epoxy resin.

The composition can be applied by contacting the metal surface with the composition so that a film is formed thereon.

DETAILED DESCRIPTION OF THE INVENTION

The invention corrosion-inhibiting composition comprises the reaction mass resulting from the cyanohydrocarbylation reaction of:
(1) an alpha,beta-unsaturated nitrile, e.g. acrylonitrile,
(2) a metal hydrocarbyl sulfonate, such as sodium petroleum sulfonate, to which reaction mass is added,
(3) an alkanol, such as methanol,
(4) a hydrocarbon diluent, such as xylene, and optionally
(5) an epoxy resin.

The unsaturated hydrocarbyl nitrile used in the cyanohydrocarbylation can be generally characterized as a nitrile having an alpha,beta-olefinic unsaturation relative to the cyano group. The unsaturated nitriles used in the process of this invention can be broadly described by the formula

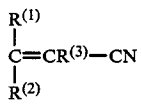

wherein $R^{(1)}$, $R^{(2)}$ and $R^{(3)}$ are hydrogen, aryl or alkaryl radicals with 6 to 10 carbon atoms, or an alkyl radical of 1 to 5 carbon atoms. These radicals can be the same or different. Representative examples of suitable nitriles which can be used include acrylonitrile, methacrylonitrile, 2-butene nitrile, cinnamonitrile, 2-pentene nitrile, p-methyl cinnamonitrile, and the like, and mixtures thereof. Acrylonitrile is presently preferred.

The metal hydrocarbyl sulfonates used in the cyanohydrocarbylation reaction can be broadly characterized by the formula

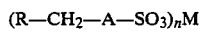

wherein R is a hydrocarbyl radical having 3 to 30 carbn atoms, n is the valence of M, i.e., 1 or 2, A represents an aromatic, alkenylene or alkylene radical having 6 to 30 carbon atoms or a valence bond. Suitable sulfonates include ammonium, alkali metal, and alkaline earth metal sulfonates. Methods of preparing petroleum sulfonates are described in U.S. Pat. Nos. 4,455,254, 3,135,693 and 2,884,445 which are incorporated by reference. The cyanohydrocarbylation reaction between the nitrile and sulfonate is carried out in accordance with the teaching of U.S. Pat. No. 4,455,254. The presently preferred sodium petroleum sulfonates used in the cyanohydrocarbylation reaction have an average equivalent weight in the range of 325 to 500.

Alcohols suitable for use in the invention include alcohols containing 1 to about 15 carbon atoms such as methanol, ethanol, 1-propanol, 2-propanol, butanols, pentanols, hexanols, heptanols, octanols, 1-pentadecanol, and mixtures of these. Polyols containing 1 to 5 carbon atoms such as ethylene glycol, 1,3-propanediol, 2,3-butanediol, glycerol and pentaerythritol can also be used. Presently, methanol is preferred.

Suitable epoxy resins have, on the average, more than one vicinal epoxide group per molecule.

The epoxy resin can be saturated or unsaturated, aliphatic, cycloaliphatic, aromatic or heterocyclic, and can bear substituents which do not materially interfere with the curing reaction. They can be monomeric or polymeric.

Suitable epoxy resins include glycidyl ethers prepared by the reaction of epichlorohydrin with a compound containing a hydroxyl group carried out under alkaline reaction conditions. The epoxy resin products obtained when the hydroxyl group containing compound is bisphenol A are represented below by structure I wherein n is zero or a number greater than 0, commonly in the range of 0 to 10, preferably in the range of 0 to 2.

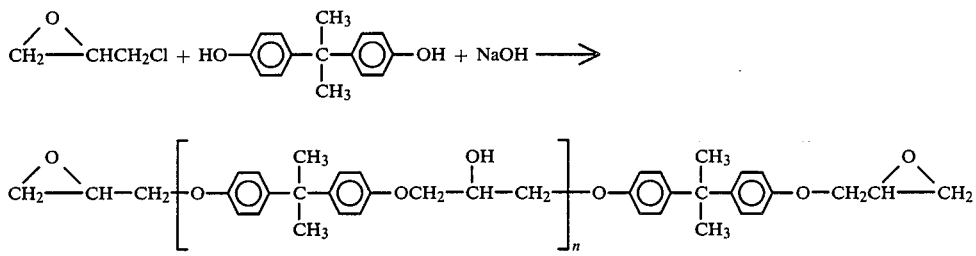

Other suitable epoxy resins can be prepared by the reaction of epichlorohydrin with mononuclear di- and tri-hydroxy phenolic compounds such as resorcinol and phloroglucinol, selected polynuclear polyhydroxy phenolic compounds such as bis(p-hydroxyphenyl)methane and 4,4'-dihydroxy biphenol, or aliphatic polyols such as 1,4-butanediol and glycerol.

Epoxy resins suitable for use in the invention have molecular weights generally within the range of 50 to about 10,000 preferably about 200 to about 1500. The commercially available Epon ® 828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185-192, and an n value in structure I above of about 0.2, is presently preferred because of the effectiveness of the invention composition containing Epon ® 828.

Additional epoxy-containing materials suitable for use in the present invention are disclosed in Great Britain No. 2,082,589 A herein incorporated by reference.

The inventive corrosion-inhibiting compositions are prepared by mixing, preferably, equal volumes of (1) the stripped reaction residue mass of a cyanohydrocarbylation reaction as described herein above, (2) an alcohol and (3) a hydrocarbon diluent. The relative volume ratios of said reaction mass to alcohol vary over the broad range of 10:1 to 1:10 and over the preferred range of 3:1 to 1:3. The presently preferred volume ratio of reaction mass to alcohol is 1:1. In practice, it is highly desirable to include sufficient hydrocarbon diluent so that the volume ratio of reaction mass to alcohol to hydrocarbon diluent is 1:1:1.

A hydrocarbon diluent can be used in the invention composition. Examples of hydrocarbon diluents suitable for use in the treating agents include the isomeric xylenes, toluene, benzene, naphtha, cyclohexylbenzene, fuel oil, diesel oil, heavy aromatic oils, Stoddard solvent, crude oil, and condensate from gas wells. Presently xylene is the preferred hydrocarbon diluent because it is an effective solvent for the other preferred components and because of the corrosion-inhibiting effectiveness of the resulting composition.

The higher-boiling aromatic hydrocarbons are particularly useful for deeper wells with higher downhole temperatures and in high temperature gas and oil wells generally.

In some treatment methods, discussed below, it is advantageous to employ a carrier liquid or drive fluid to force a slug of the corrosion-inhibiting composition down into the well being treated. Any of the hydrocarbons listed above as suitable diluents can be used. For practical and economic reasons, diesel oil, sea water or condensate from the well being treated are preferred carrier liquids or drive fluids.

The cyanohydrocarbylation can be carried out under conditions of temperature and pressure such that the reagents involved remain in the liquid phase. As a general rule, the temperature will be in the range of about 0° C. to about 100° C., and the pressure will be sufficient to maintain the reaction mass in essentially a liquid state. The reaction duration will be dependent primarily upon economic considerations. Typical reaction times are in the range of several minutes to about 24 hours.

The cyanohydrocarbylation is carried out in the essential absence of water and in the presence of a base. This base can be any of the strong bases known to catalyze the substitution reaction here involved. The base is preferably selected from the group consisting of the alkali metal hydroxides and tertiary amines. Most preferably, the reaction is carried out in the presence of sodium hydroxide and/or potassium hydroxide. Other bases well known in the art can also be used such as tertiary amines including triethylamine, pyridine, quinoline and the like.

Suitable reaction solvents include hydrocarbons, preferably aromatic hydrocarbons, such as benzene, toluene and xylene; aliphatic hydrocarbons such as pentane, heptane and octane; halogenated hydrocarbons such as methylene chloride and carbon tetrachloride; esters such as ethyle acetate and butyl acetate; and ethers such as dioxane, tetrahydrofuran and 1,2-dimethoxyethane. The ingredients involved in the process of this invention are employed in ranges that are not overly critical but generally within the following limits

| | mole sulfonate / mole nitrile | |
|---|---|---|
| | Broad | Preferred |
| Molar ratio Organic sulfonate:unsaturated hydrocarbyl nitrile | 10:1 to 1:10 | 2:1 to 1:2 |

The base is present in a 0.1 to 20 mol. % level based on the limiting reagent.

The instant corrosion-inhibiting composition is useful for coating oxidizable metal surfaces, particularly surfaces of objects made from iron and steel. It is particularly useful for treating metal surfaces such as metal pipes and casings in oil, gas and geothermal wells which are subject to high temperatures and pressure and corrosive chemical agents and for treating pipelines which carry fluids containing water.

Down-hole treatments, with the corrosion-inhibiting compositions can be effected by a variety of methods depending upon the particular chemical and physical characteristics of the well being treated. The following down-hole treatment methods can be used to apply the composition to metal surfaces of equipment used to recover natural fluids from a subterranean reservoir.

Batch Treatment

The invention composition comprising the reaction mass resulting from the reaction of unsaturated hydrocarbyl nitrile and metal hydrocarbyl sulfonate plus hydrocarbon diluent and optionally an epoxy resin is introduced preferably in an oil carrier into the annulus of a cased wellbore between the casing and the tubing. The well is returned to production and the injected compositions are gradually returned with the produced fluids, effecting en route the coating of contacted metal surfaces with a corrosion-resistant film. Alternatively in this method, a liquid column of the treating agent can be placed in the tubing or the annular space and allowed to stand for a time which can range from 10 minutes to 24 hours before resuming production, usually at least 1 hour.

Extended Batch Treatment

The invention composition is injected into the annular space of a cased wellbore, the well is closed off, and the composition is continuously circulated with well fluids down the annulus and up the tubing for an extended period of time which can vary widely but will usually be between 2 and 48 hours. At the end of the specified time period, the well is returned to production.

Squeeze Treatment

The invention composition is injected down a cased wellbore penetrating a subterranean formation and is forced into the formation against formation pressure with high-pressure pumps. The composition can be injected within a gelled or dispersed polymer matrix based, for example, on polyacrylamides, biopolysaccharides, or cellulose ethers. After the pressure is released, the treating agent is slowly produced back with the recovered fluids, resulting in the application of a corrosion-resistant film on metal surfaces contacted by the treating agent as it flows to the surface. This method is particularly suitable in high-pressure gas or oil wells.

Spearhead Treatment

A highly concentrated slug of the invention composition is injected into the tubing of a cased borehole and pressured down the tubing with nitrogen or a fluid column of a brine solution such as 2 weight percent aqueous potassium chloride. When the pressure is released, the aqueous brine column or nitrogen and the corrosion-inhibiting composition are produced up the tubing. The composition as a concentrated slug thus contacts the metal walls of the tubing and lays down a protective film as it flows in a downward and upward circuit.

When applying the composition to the metal tubing of, for example, a gas or oil well, it is not necessary to pre-coat the treated metal surfaces with oil or other substances prior to applying the invention composition, and the treated surfaces may or may not have an oil coating prior to the application. It is contemplated that the invention composition will provide effective corrosion inhibition in wells producing as much as 95 percent brine and 5 percent oil. The nature of the film thus formed can vary according to the particular composition used and the environment in which it is applied, but it has been found that the film will generally be a soft, sticky layer adhering to the metal surface.

EXPERIMENTAL PROCEDURE

A series of laboratory corrosion inhibition tests were carried out in 1-liter Erlenmeyer flasks equipped with magnetic stirring bars, under laboratory conditions designed to simulate corrosive oil-water environments encountered in field drilling sites. A charge of 50 mL of crude oil and 950 mL of synthetic brine was used in each run. A slow stream of carbon dioxide was bubbled through the solution during each test to maintain the mixture near saturation with $CO_2$ at ambient conditions. After charging 950 mL of synthetic North Sea water (93.1 g $CaCl_2.2H_2O$, 46.4 g $MgCl_2.6H_2O$ and 781.1 g NaCl per 5 gal. distilled $H_2O$) into the Erlenmeyer flask, the inventive corrosion inhibiting composition was added followed by addition of crude oil. The rate of corrosion and pitting index were determined using a Corrater® monitoring system available from Rohrback Instruments. A carbon steel probe was suspended in the stirred oil-water mixture maintained at approximately 49° C. during each run.

In a series of typical runs, individual mixtures of the cyanohydrocarbylated reaction mass (1 volume) in methanol/xylene (1:1 volume/volume) and 3:1 by weight samples of epoxy resin/xylene were used. For a number of laboratory runs, it was convenient, for example, to prepare the methanolic stock solution by combining 5 mL of methanol with 5 mL of xylene and 5 mL of the cyanohydrocarbylated reaction mass. A stock solution of the epoxy resin in xylene was prepared by combining, for example, 3 g of the epoxy resin with 1 g of xylene. Specified aliquots of these stock solutions were then transferred to the oil-water mixture contained in the 1-liter Erlenmeyer flasks. The corrosion rate and pitting index were observed after 20 hours. Results are summarized in Table I of Example I.

EXAMPLE I

The cyanohydrocarbylated reaction mass used in this example was prepared in accordance with the procedure described in U.S. Pat. No. 4,455,254 (see Example I and III therein). The reaction mass resulted from the interaction of acrylonitrile and Witco TRS 10-410 (sodium petroleum sulfonate). Corrosion tests were carried out in accordance with the above general experimental procedure and selected results are summarized in Table I.

TABLE I

Cyanoethylated Petroleum Sulfonate in Corrosion Inhibitor Compositions

| Run No. | Type of Run # | CPS* | CH₃OH | EPON® 828[c] | Xylene | Corrosion Rate (mpy) | Pitting Index |
|---|---|---|---|---|---|---|---|
| 1 | Inv.[b,c] | (+) | (+) | (+) | (+) | 0.01 | 0.25 |
| 2 | Inv.[b,c] | (+) | (+) | (+) | (+) | 0.03 | 0.02 |
| 3 | Inv.[b] | (+) | (+) | (−) | (+) | 0.01 | 0.0 |
| 4 | Inv.[b] | (+) | (+) | (−) | (+) | 0.01 | 0.0 |
| 5 | C[d] | (+) | (−) | (−) | (+) | 0.9 | 0.1 |
| 6 | C[d] | (+) | (−) | (−) | (+) | 2.0 | 1.0 |
| 7 | C[e] | (+) | (−) | (+)[a] | (+) | 10 | 3 |
| 8 | C[e] | (+) | (−) | (+)[a] | (+) | 3.2 | 0.6 |

Inv. represents "Inventive"; c represents "Control".
*CPS represents "Cyanoethylated Petroleum Sulfonate".
[a]This system also contained N—tallow-1,3-propanediamine curing agent.
[b]In runs 1, 2, 3 and 4, 0.2 mL aliquots of a 1:1:1 v/v/v stock solution of cyanoethylated petroleum sulfonate/methanol/xylene were used.
[c]In runs 1 and 2, 0.1 mL aliquots of a 3:1 wt/wt stock solution of EPON® 828/xylene were used. EPON® 828 is a commercially available epoxy resin with a molecular weight of about 400 and an epoxy equivalent of about 185-192.
[d]In runs 5 and 6, 0.2 mL aliquots of a 1:1 v/v stock solution of cyanoethylated petroleum sulfonate in xylene were used.
[e]In runs 7 and 8, 0.2 mL aliquots of a 1:1:1 v/v/v stock solution of cyanoethylated petroleum sulfonate/methanol/Duomeen® T (N—tallow-1,3-propanediamine) were used.

Referring to the invention runs 1–4 in Table I, it is evident that the corrosion rate was reduced essentially to zero mils per year (mpy) in the system containing the cyanoethylated petroleum sulfonate, xylene and methanol (runs 3 and 4) optionally with added epoxy resin (runs 1 and 2). Control runs 5 and 6 demonstrate the relative ineffectiveness of the cyanoethylated petroleum sulfonate in xylene with no added methanol. Control run 7 and 8 illustrate that the cyanoethylated petroleum sulfonate can not effectively replace methanol in a corrosion inhibiting system comprising methanol-polyamine-epoxy resin-xylene.

That which is claimed is:

1. A method for treating and inhibiting the corrosion of metal surfaces in a well used for the recovery of natural fluids from a subterranean formation which comprises injecting into a well a composition comprising (a) the reaction mass resulting from reacting (1) unsaturated hydrocarbyl nitrile having the formula

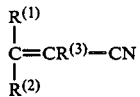

wherein $R^{(1)}$, $R^{(2)}$ and $R^{(3)}$ are hydrogen, aryl or alkaryl radicals with 6 to 10 carbon atoms or alkyl radicals with 1 to 5 carbon atoms, and wherein these radicals can be the same or different, and (2) metal hydrocarbyl sulfonate having the formula

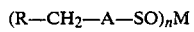

wherein R is a hydrocarbyl radical having 3–30 carbon atoms, A is an aromatic, alkenylene or alkylene radical having 6 to 30 carbon atoms, n is the valence of M, and M is selected from the group consisting of ammonium, and alkali and alkaline earth metals to produce a cyanohydrocarbylated hydrocarbyl sulfonate product in the presence of a base and in the essential absence of water, and (b) an alcohol containing 1 to about 15 carbon atoms and a volume ratio of (a) to (b) ranging from 10:1 to 1:10, and allowing the composition to contact the metal surfaces for a time sufficient to form corrosion-inhibiting film thereon.

2. A method according to claim 1 wherein said composition is forced down the well using a drive fluid.

3. A method for inhibiting corrosion of metal surfaces in a well producing natural fluids from a subterranean reservoir which comprises the steps of (a) stopping production of the natural fluids, (b) injecting into the well a composition comprising the reaction mass resulting from reacting (1) unsaturated hydrocarbyl nitrile having the formula

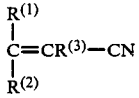

wherein $R^{(1)}$, $R^{(2)}$ and $R^{(3)}$ are hydrogen, aryl or alkaryl radicals with 6 to 10 carbon atoms or akyl radicals with 1 to 5 carbon atoms, and wherein these radicals can be the same or different, and (2) metal hydrocarbyl sulfonate having the formula

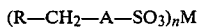

wherein R is a hydrocarbyl radical having 3–30 carbon atoms, A is an aromatic, alkenylene or alkylene radical having 6 to 30 carbon atoms, n is the valence of M, and M is selected from the group consisting of ammonium, and alkali and alkaline earth metals to produce a cyanohydrocarbylated hydrocarbyl sulfonate product in the presence of a base and in the essential absence of water, and combining said sulfonate product with (3) an alcohol containing 1 to about 15 carbon atoms and a volume ratio of sulfonate product to alcohol ranging from 10:1 to 1:10, and (c) returning the well to production thereby causing the composition to be returned with the natural fluids and to be deposited as a corrosion-inhibiting film en route on metal surfaces with which it comes in contact.

4. A method according to claim 3 wherein said reaction mass additionally contains (4) a hydrocarbon diluent, and optionally (5) an epoxy resin having a molecular weight within the range of 50 to about 10,000.

5. A method according to claim 4 wherein the corrosion-inhibiting composition comprises the reaction mass resulting from the reaction of acrylonitrile and a petroleum sulfonate having an average equivalent weight of 325 to 500; methanol, xylene, and an epoxy resin having a molecular weight within the range of 200 to 1500.

6. A method according to claim 5 wherein the epoxy resin is a condensate of epichlorohydrin and bisphenol A.

7. A method according to claim 6 wherein the epoxy resin has a molecular weight of about 400 and an epoxide equivalent of from 185 to 192.

8. A method according to claim 4 wherein said composition is forced down a well using a drive fluid.

9. A method according to claim 3 in which the metal surfaces includes tubing within a well casing, the method further comprising injecting the corrosion-inhibiting composition through the tubing and between the tubing and casing for a time at least sufficient to form a corrosion-inhibiting film thereon before returning the well to production.

10. A method according to claim 9 wherein said composition is forced down a well using a drive fluid.

11. A method for treating metal surfaces to inhibit corrosion thereof comprising contacting a metal surface with a composition comprising
   (a) the reaction adduct resulting from reacting
      (1) unsaturated hydrocarbyl nitrile having the formula

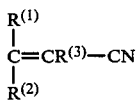

wherein $R^{(1)}$, $R^{(2)}$ and $R^{(3)}$ are hydrogen, aryl or alkaryl radicals with 6 to 10 carbon atoms or alkyl radicals with 1 to 5 carbon atoms, and wherein these radicals can be the same or different, and
      (2) metal hydrocarbyl sulfonate having the formula

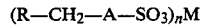

wherein R is a hydrocarbyl radical having 3–30 carbon atoms, A is an aromatic, alkenylene or alkylene radical having 6 to 30 carbon atoms, n is the valence of M, and M is selected from the group consisting of ammonium, and alkali and alkaline earth metals to produce a cyanohydrocarbylated hydrocarbyl sulfonate product in the presence of a base and in the essential absence of water, and
   (b) an alcohol containing 1 to about 15 carbon atoms and a volume ratio of (a) to (b) ranging from 10:1 to 1:10, and allowing the composition to contact the metal surfaces for a time sufficient to form corrosion-inhibiting film thereon.

12. A method according to claim 11 wherein said composition contains
   (c) a hydrocarbon diluent, and, optionally,
   (d) an epoxy resin having a molecular weight within the range of 50 to about 10,000.

13. A method according to claim 11 wherein the volume ratio of (a) to (b) is from 3:1 to 1:3.

14. A method according to claim 12 wherein the volume ratio of (a) to (b) to (c) is 1:1:1.

15. A method according to claim 13 wherein the volume ratio from (a) to (b) is 1:1.

16. A method according to claim 11 wherein the corrosion-inhibiting composition comprises the reaction mass resulting from the reaction of acrylonitrile and a petroleum sulfonate having an average equivalent weight of 325 to 500; methanol, xylene, and an epoxy resin having a molecular weight within the range of 200 to 1500.

17. A method according to claim 16 wherein the volume ratio of reaction mass to methanol to xylene is 1:1:1.

* * * * *

UNITED STATES PATENT AND TRADEMARK OFFICE
CERTIFICATE OF CORRECTION

PATENT NO. : 4,556,110

DATED : December 3, 1985

INVENTOR(S) : YULIN WU

It is certified that error appears in the above-identified patent and that said Letters Patent is hereby corrected as shown below:

Col. 7, claim 1, line 60, "$(R-CH_2-A-SO)_n M$" should be ---$(R-CH_2-A-SO_3)_n M$---.

Signed and Sealed this

Sixteenth Day of September 1986

[SEAL]

Attest:

DONALD J. QUIGG

Attesting Officer     Commissioner of Patents and Trademarks